United States Patent [19]

Segal

[11] 4,192,439

[45] Mar. 11, 1980

[54] SPICE RACK FOR STORING AND DISPLAYING SPICES

[76] Inventor: Paul Segal, 15 Colonial Rd., White Plains, N.Y. 10605

[21] Appl. No.: 973,036

[22] Filed: Dec. 26, 1978

[51] Int. Cl.² .................. B67D 5/64; A47G 19/24
[52] U.S. Cl. ............................ 222/130; 222/142.3; 222/154; 222/465; 312/234; 220/20; 206/45.34; 40/312
[58] Field of Search .............. 222/129, 130, 132, 135, 222/142.1, 142.3, 143, 179.5, 180, 465, 480, 482–487, 565, 154, 158; 312/198, 234, 252, 245; 40/107, 312; 229/10, 19, 20, 317; 206/561, 455, 456, 45.34; 220/20, 22; 211/71, 74, 75; D7/55; D6/114

[56] References Cited

U.S. PATENT DOCUMENTS

| | | | |
|---|---|---|---|
| 731,330 | 6/1903 | Woodruff | 16/124 |
| 1,036,358 | 8/1912 | Skinner | 220/82 |
| 1,379,035 | 5/1921 | Michel A. . | |
| 2,560,761 | 7/1951 | Ferguson | 222/143 |
| 2,730,423 | 1/1956 | Mock | 312/333 |
| 3,169,670 | 2/1965 | Taylor | 222/480 |

| | | | |
|---|---|---|---|
| 4,125,954 | 11/1978 | Barbieri | 40/107 |

OTHER PUBLICATIONS

House & Garden, page 29, 8/1958.

*Primary Examiner*—H. Grant Skaggs
*Attorney, Agent, or Firm*—William Freedman

[57] ABSTRACT

This spice rack comprises a cabinet divided into a plurality of cubicles and, within the cubicles, a plurality of removable spice boxes. Each spice box comprises a front wall, a back wall, and a partition parallel to the front wall dividing the box into a large-volume dispensing chamber between the partition and the back wall and a small-volume reserve chamber between the partition and the front wall. The front wall is transparent so that spice stored in the reserve compartment is readily visible from the front of the cabinet when the spice box is located in its associated cubicle. Each spice box has a top with perforations therein communicating with the associated dispensing compartment to allow spices to be dispensed therethrough. These tops are effectively imperforate where aligned with the associated reserve compartments.

7 Claims, 7 Drawing Figures

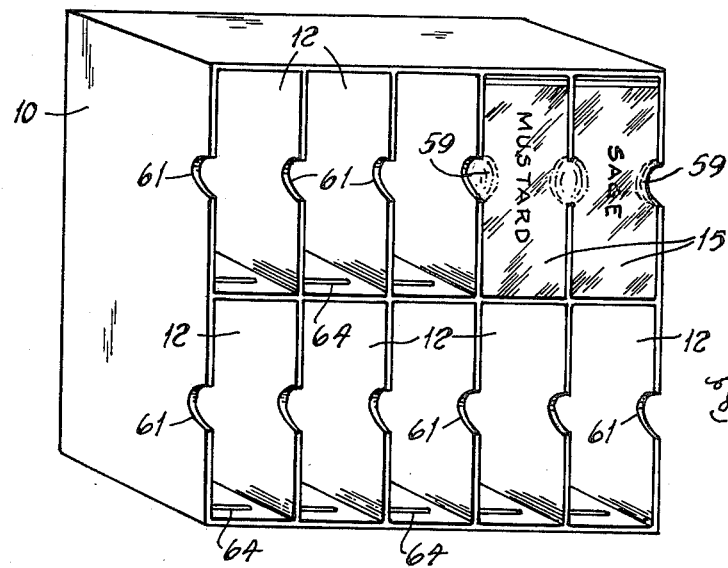
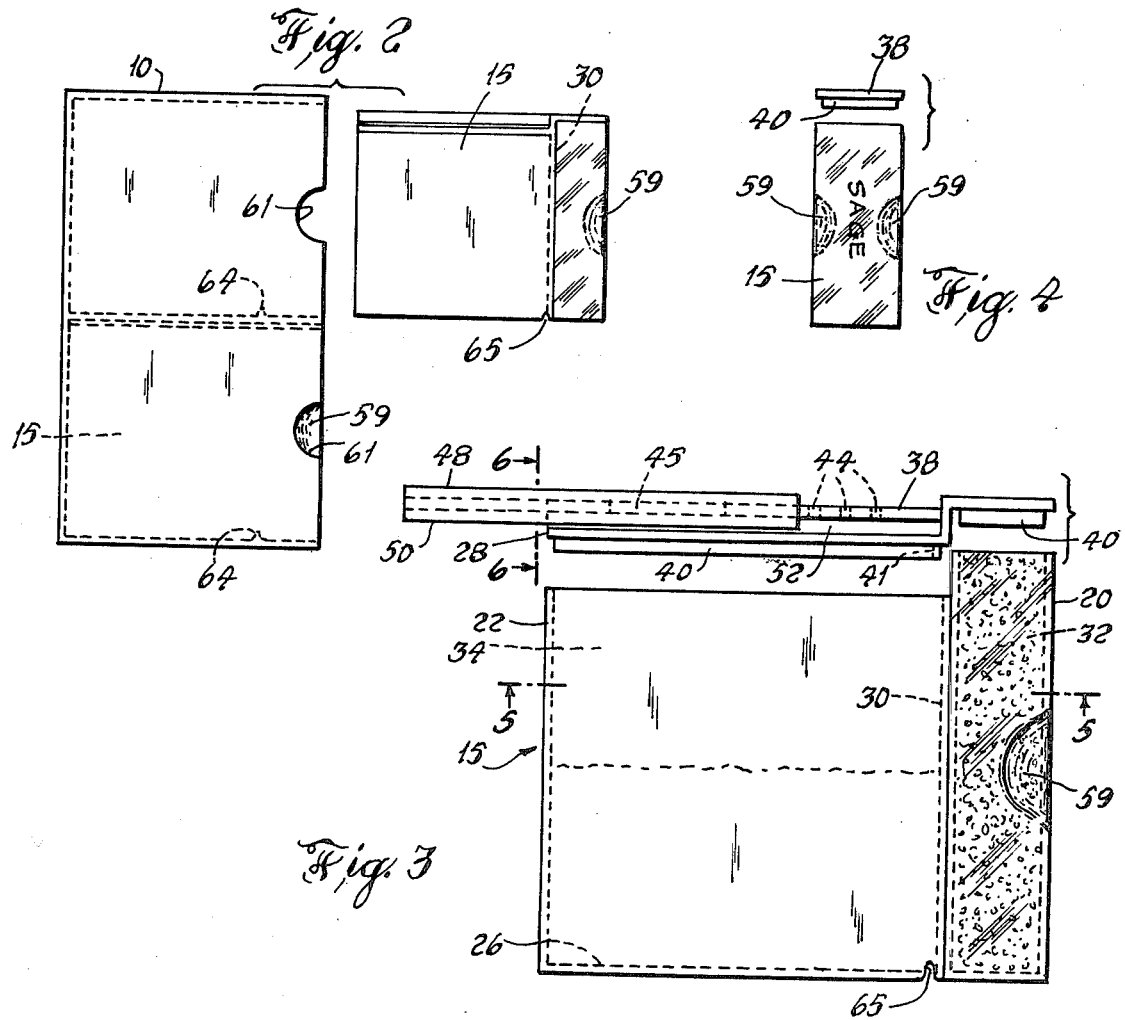

SPICE RACK FOR STORING AND DISPLAYING SPICES

BACKGROUND

This invention relates to a spice rack that comprises a plurality of spice boxes and a cabinet for storing and displaying the spice boxes and, more particularly, relates to a spice rack in which the spice in each box is readily visible from the front of the cabinet and can cover an area extending behind substantially the entire exposed front face of the box despite use of the spice within the box.

The usual spice rack comprises a cabinet or framework having shelves on which spice boxes are stored and displayed. In some spice racks, the spice boxes are made of metal or some other opaque material, and the spices stored in them cannot be seen from the front of the cabinet. In other spice racks, the spice boxes take the form of transparent jars. The spices in these jars can usually be seen from the front of the cabinet. When all the jars are full, a pleasing appearance is presented, but as the spices in some of the jars are used, the overall appearance becomes increasingly less pleasing to certain viewers, especially to those who are attracted by an appearance of uniformity and by an appearance of full, neatly-arranged containers, especially where food items are involved. Also, certain viewers are bothered by the sight of residue clinging to the walls of the empty portion of a transparent container on display.

SUMMARY

An object of my invention is to provide a spice rack in which the spice in each spice box is readily visible from the front of the rack and can cover an area extending behind generally the entire front face of each spice box despite extensive use of spice within the box.

Another object of my invention is to provide a spice rack in which substantially the entire front of the rack can present a largely unbroken facade of different types of spices, their different colors and textures readily visible, the facade retaining substantially its original appearance despite use of the spices in the boxes.

Another object is to provide a spice rack in which spice boxes stored in the rack and having transparent fronts can be made to appear substantially full when viewed from the front of the rack even though the boxes have been partially emptied through use.

Another object is to provide a spice rack in which spice boxes, positioned closely adjacent each other to provide a largely unbroken facade of spices, can be easily removed from the spice rack by hand.

Still another object is to provide simple and inexpensive means for retaining the spice boxes in their cubicles with little chance of their being accidentally ejected by vibrations or the like.

Still another object is to construct the spice box and its top in a way that allows spice to be dispensed from the box without disturbing the spice stored for display purposes adjacent the front wall of the box.

Still another object is to provide a spice rack which can serve as a modular unit that is readily combinable with additional spice racks of the same construction to form a compact grouping of spice racks.

In carrying out my invention in one form, I provide a cabinet comprising a plurality of cubicles and a plurality of spice boxes for respectively fitting within the cubicles in such a way as to be readily removable therefrom. At least some of the spice boxes each comprises a front wall, a back wall, spaced sidewalls interconnecting the front and back walls, a bottom wall, and a removable top. A partition generally parallel to the front wall divides the spice box into a relatively large-volume dispensing chamber between the partition and the back wall and a relatively small-volume reserve chamber between the partition and the front wall. The front wall is transparent so that spice stored in the reserve compartment will be readily visible from the front of the cabinet when the spice box is located within its associated cubicle. Each cubicle and the spice box received therein have a rectangular cross-section in a plane parallel to the front wall of the seated spice box. The external dimensions of the spice box in this cross-sectional plane are only slightly less than the internal dimensions of the associated cubicle in this plane so that the spice box fits snugly within the cubicle. The tops of at least some of the spice boxes each have perforations therein communicating with the associated dispensing compartment to allow spice to be dispensed therethrough. These tops are effectively imperforate where aligned with the associated reserve compartment.

BRIEF DESCRIPTION OF DRAWINGS

For a better understanding of the invention, reference may be had to the accompanying drawing, wherein:

FIG. 1 is a perspective view of a spice rack embodying one form of my invention. Only some of the spice boxes are shown in place within the cabinet of the spice rack.

FIG. 2 is an end view of the cabinet of FIG. 1 with one spice box in place within its cubicle and one withdrawn from its cubicle.

FIG. 3 is an enlarged side view of one of the spice boxes with spice shown therein and the top removed for illustration purposes.

FIG. 4 is a front elevational view of one of the spice boxes with its top removed.

DETAILED DESCRIPTION OF PREFERRED EMBODIMENT

Referring now to FIG. 1, the illustrated spice rack comprises a cabinet 10 having two horizontal rows of closely adjacent cubicles 12, each cubicle being of rectangular cross-section. The top row of cubicles is identical to the bottom row, and all the cubicles in the top row are in horizontal alignment with corresponding cubicles in the bottom row.

The spice rack further comprises a plurality of spice boxex 15, one for each of the cubicles 12. In FIG. 1 two of these spice boxes 15 are shown in place within their respective cubicles. The others are not shown.

Figure 5:
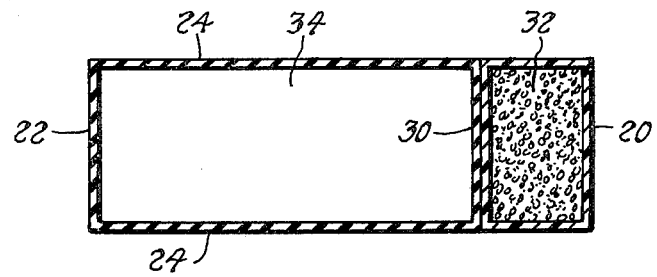
FIG. 5 is a sectional view along the line 5—5 of FIG. 3.

Referring to FIGS. 3 and 5, each spice box 15 comprises a front wall 20, a back wall 22, and two spaced-apart side walls 24 interconnecting the front and back walls. Each spice box further comprises a bottom wall 26 and a top 28. Extending generally parallel to the front wall 22, there is a partition 30 that divides the spice box into two separate compartments 32 and 34. The front compartment 32 is a relatively small-volume reserve compartment, and the back compartment 34 is a relatively large-volume dispensing compartment. Each of these compartments 32 and 34 is adapted to be filled with spice for storage in the spice box.

The front wall 20 and preferably the side walls of the reserve compartment 32 are transparent so that spice stored within the reserve compartment is readily visible from the front of the spice box and from the front of the cabinet 10 when the spice box is positioned within its cubicle. In a preferred form of the invention, the partition 30 and the remaining walls of the dispensing compartment 24, including its top, are opaque so that spice stored therein is protected from degradation by exposure to light.

Although the partition 30 is shown in FIG. 5 as comprising two walls joined together, it may, if desired, be made of a single wall common to both the dispensing and reserve compartments.

The top 28 of the spice box 15 comprises a closure member 38 that extends across the top of both the dispensing compartment 34 and the reserve compartment 32. This closure member 38 has a short downwardly-projecting flange 40 located near its periphery and extending along the entire periphery of the top. This flange 40 fits tightly within the external walls 20, 22, and 24 of the spice box when the top is in its closed position, thus providing a good seal between the top and these external wall. Preferably there is also a flange portion 41 extending across the dispensing compartment closely adjacent partition 30 so as to improve the seal for this compartment.

Figure 6:
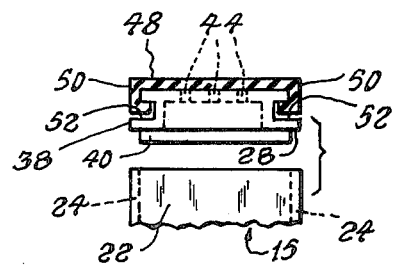
FIG. 6 is an enlarged end view of the top of the spice box of FIG. 3 taken along the line 6—6 of FIG. 3.

The closure member 38 has a plurality of small perforations 44 therein communicating with the dispensing compartment 34 and preferably also a relatively large opening 45 therein communicating with the dispensing compartment. When these perforations are open, spices can be dispensed from the dispensing compartment through them when the spice box is inverted and shaken. However, these perforations 44 and 45 are normally closed by a cover 48 that is slidably mounted on the closure member 38. Referring to FIGS. 3 and 6, this cover 48 includes L-shaped guide elements 50 at its lateral edges, the foot portion of each guide element fitting within a groove 52 in the closure member 38. As viewed in FIG. 3, the cover can be slid to the left a short distance to uncover only the small perforation 44 or can be slid further to the left to uncover the large opening 45. The large opening will normally be uncovered by the user only when it is desired to dispense large-particle spice that cannot be shaken through the small perforations 44.

The flange 40 on the top 28 fits tightly within the walls of the spice box so as to provide a good seal and so as to hold the cover firmly in place. Despite this tight fit, however, it is a simple matter to remove the top. This can be done by sliding the cover 48 a short distance to the left as seen in FIG. 3. Then the cover can be used as a lever for prying the top off. This is done simply by pressing the partially-withdrawn cover in a downward direction, transmitting removal force to the closure member 38 through the inter-nesting guide portions 50 and 52.

It is to be noted that the closure member 38 is imperforate in the region where it covers the reserve compartment 32. Thus, when this member 38 is in place and the spice box is inverted to shake spice from the dispensing compartment 34, the spice stored in the reserve compartment remains in place within the reserve compartment.

Although I prefer to form the closure member as a simple one-part element, it is to be understood that my invention in its broader aspects comprehends the use of separate closure elements for the two compartments 32 and 34. In such an arrangement, however, the cover 48 cannot be used to pry the separate top off the reserve compartment in the manner described above.

When spice boxes 15, having their reserve compartments filled with spices, are inserted into all the cubicles 12 of the cabinet 10, an especially striking and attractive facade is presented when viewed from the front of cabinet 10. Since the front wall of each spice box is transparent, the spice in the reserve compartment is readily visible behind the front wall. If the reserve compartment is full, there is spice covering the area extending behind substantially the entire front face of the spice box. With the reserve compartments of all the spice boxes full, there is a virtually unbroken facade of different types of spices, their colors and textures readily visible, extending across the front of the cabinet 10.

This attractive facade can remain virtually unchanged in appearance despite extensive use of the spices in the various spice boxes. This is the case because the spices that are used are those located in the back, or dispensing, compartment of each spice box. The spices stored in the front compartment can remain unused indeffinitely since they are virtually sealed in the front compartments by the imperforate top and walls of the front compartment.

A feature which contributes to the impression of a largely unbroken facade of spices when viewed from the front of the cabinet 10 is the fact that the spice boxes are located very close together and are of generally rectangular cross-section taken in a plane parallel to the front wall. As a result, there are no large irregular spaces between the juxtaposed spice boxes. This rectangular cross-section and the closeness-together of the spice boxes also contribute to a very compact spice rack. Related to the closeness-together of the spice boxes is the fact that the cubicles 12 are also of rectangular cross-section and of a size to snugly receive the spice boxes. In this regard, the external dimensions of each spice box considered in a plane parallel to the front wall of the box are only slightly less than those of the associated cubicle in this same plane.

To facilitate removal of the close-together spice boxes from the cabinet 10, each spice box is provided with two dimples 59 at its front at about mid-height. One dimple 59 is located where the front wall 20 intersects one side wall 24, and the other is located where the front wall intersects the other side wall. The juxtaposed dimples 59 in the juxtaposed spice boxes are vertically aligned so as to define a space bounded by aligned juxtaposed dimples into which a finger tip can be inserted to facilitate grasping of the spice box that is to be removed. Each dimple 59 preferably is of the configuration of a quarter of a sphere so that the space bounded by aligned dimples is approximately hemispherical. The surface of such a shape is smooth and free of hidden recesses or undercuts and can thus be easily cleaned. It is to be understood that my invention in its broader aspects comprehends the use of dimples having shapes other than those illustrated, e.g., oval shapes.

The cabinet 10 has thin walls located between the juxtaposed cubicles. These walls have semi-circular recesses 61 in their front edges generally aligned with the dimples 59 in the juxtaposed spice boxes on opposite sides of the wall so that the wall does not interfere with entry of a finger tip into the hemispherical space.

To restrain the spice boxes 15 within the cubicles 12 so as to prevent their being ejected as a result of vibrations or the like, I provide the bottom wall of each cubicle with an integrally formed cleat 64 projecting upwardly a short distance therefrom. Each spice box 15 has in its lower wall an identation 65 that is adapted to receive the cleat 64 in the associated cubicle when the spice box is fully inserted into the associated cubicle. This interengagement between cleat 64 and indentation 65 restrains the spice box 15 against forward motion. To remove a spice box from its cubicle, it is first grasped at dimples 59 and lifted slightly to effect disengagement between the cleat and the identation and is then pulled forwardly to the exterior of the cubicle. The clearance space between the top of the spice box and the top wall of the associated cubicle is sufficient, but just sufficient, to allow the spice box to be sufficiently lifted to release the indentation 65 from the cleat 64 and to allow the spice box thereafter to be slid forward to the cubicle exterior.

It is to be noted that the front wall of each spice box has a smooth exterior surface which is substantially flush with the front surface of the cabinet when the box is fully inserted into the cabinet 10. As a result, the exterior front surfaces of all the fully-inserted spice boxes 15 are in substantially a single plane, and the front face of the cabinet is in this same plane. This coplanar relationship makes it very easy to quickly clean the spice rack, and without the need to remove the spice boxes. This can be done simply by running a damp cloth across the smooth front surface of the spice rack including the spice boxes. If the dimples 59 require minor cleaning, this can also be done without removing the spice boxes; but if a more thorough cleaning is desired, it is a simple matter to remove one or more of the boxes and subject them to a thorough cleaning.

The spice boxes 15 can be individually labeled on their front faces with suitable adhesive-coated name tags or decals. Preferably these name tages or decals are transparent except for the lettering.

It is to be noted that the illustrated spice rack is a modular unit which can be combined with additional spice racks of the same construction to form a compact grouping of spice racks. For example, another identical rack can be stacked on top of the illustrated rack or can be positioned horizontally adjacent the illustrated rack. Either of these groupings may be supported on a counter top or hung on a kitchen wall.

Figure 7:
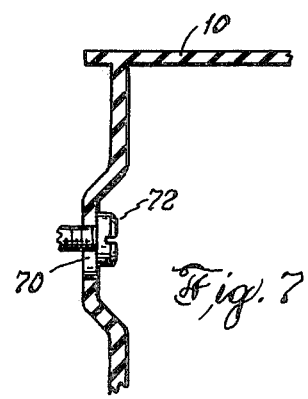
FIG. 7 is a sectional view of a portion of the back wall of the cabinet 10 of FIG. 1.

Referring to FIG. 7, the back wall of the cabinet 10 is provided with suitable apertures, such as aperture 70, to receive headed screws 72 or the like to enable it to be hung on a kitchen wall. The region of the back wall around each opening is recessed so that the head of the fastening screw does not project forwardly of the back wall and thus does not interfere with full seating of the juxtaposed spice box in its associated cubicle 12.

While the front compartment 32 in each spice box 15 is intended primarily for display of the type of spices within the box, this front compartment can also serve as a reserve compartment from which spices can be taken when the back, or dispensing, compartment needs replenishing. The resulting empty space in the front compartment may detract from the appearance of the spice rack, but this need not be permanent and can be easily corrected by refilling the front compartment when additional spice is available for this purpose.

While the components of this spice rack may be made of various types of material, I prefer to make them all of a suitable plastic such as polystyrene. The walls of the reserve compartment are preferably of clear polystyrene, whereas all the remaining components are of opaque polystyrene of any desired color.

While I have shown and described a particular embodiment of my invention, it will be obvious to those skilled in the art that various changes and modifications may be made without departing from the invention in its broader aspects; and I therefore intend in the following claims to cover all such changes and modifications as fall within the true spirit and scope of my invention.

What I claim as new is:

1. In a spice rack:
   (a) a cabinet comprising a plurality of cubicles of generally rectangular cross-section,
   (b) a plurality of spice boxes for respectively fitting within said cubicles in such a way as to be removable therefrom and reinsertable therein,
   (c) at least some of said spice boxes each comprising a front wall, a back wall, spaced-apart sidewalls interconnecting said front and back walls, a bottom wall, a removable top, and a partition generally parallel to said front wall dividing said spice box into a relatively large-volume dispensing compartment between said partition and said back wall and a relatively small-volume reserve compartment between said partition and said front wall, said front wall being transparent so that spice stored within said reserve compartment will be readily visible from the front of said cabinet when said spice box is located within its associated cubicle,
   (d) the at least some of said spice boxes each having a generally rectangular cross-section in a plane parallel to said front wall with external dimensions in said cross-sectional plane only slightly less than the internal dimensions of the associated cubicle in said plane so that said box fits snugly within said associated cubicle,
   (e) and the tops of the at least some of said spice boxes each having perforations therein communicating with the associated dispensing compartment to allow spice within said dispensing compartment to be dispensed through said perforations, said tops being effectively imperforate where aligned with said reserve compartment.

2. The spice rack of claim 1 in which the walls of said dispensing compartment are opaque, thereby to protect the spice therein from being degraded by exposure to light.

3. The spice rack of claim 1 in which:
   (a) said cubicles are located in juxtaposed side-by-side relationships,
   (b) each spice box has a pair of dimples at its front, one dimple being located where said front wall intersects one of the sidewalls and the other being located where the front wall intersects the other sidewall, and
   (c) the juxtaposed dimples in the spice boxes inserted in juxtaposed cubicles are substantially aligned so as to provide a space defined by aligned juxtaposed dimples into which a finger tip can be inserted to facilitate grasping of a spice box for removal.

4. The spice rack of claim 3 in which said cabinet has thin walls between juxtaposed cubicles, and said walls having recesses in their front edges generally aligned with the dimples in the juxtaposed spice boxes on opposite sides of the wall so that the wall does not interfere with entry of a finger tip into said space defined by aligned juxtaposed dimples.

5. The spice rack of claim 1 which:
   (a) at least some of said cubicles each has a bottom wall containing an integrally formed cleat projecting upwardly therefrom,
   (b) the bottom wall of the spice box received in a cubicle having said cleat has an indentation therein for receiving said cleat when the spice box is fully inserted into said cubicle, thereby restraining said spice box against forward motion within said cubicle due to vibrations, and
   (c) the clearance space between the top of said spice box and the top wall of the associated cubicle being sufficient to allow said spice box to be lifted sufficiently to release said indentation from said cleat, thereafter allowing removable of said spice box from the cubicle.

6. The spice rack of claim 1 in which said top of a spice box comprises:
   (a) a closure member extending between said front and back walls and having a flange adjacent its periphery tightly fitting within the front, back, and side walls of said spice box, and
   (b) a cover slidably mounted on said closure member and normally covering said perforations, the cover being slidable from its normal position to uncover said perforations.

7. The spice rack of claim 6 in which internesting structure on said closure member and said cover slidably mounts the cover on said closure member, said cover when slid out of its normal position being usable as a lever to apply force through said internesting structure for prying said top off of the remainder of the spice box.

* * * * *